July 31, 1934.   J. R. G. J. BLANCARD ET AL   1,968,068
PROCESS AND APPARATUS FOR MEASURING THE PHASE DIFFERENCE OF ELECTRIC CURRENTS
Filed Oct. 4, 1932    2 Sheets-Sheet 1
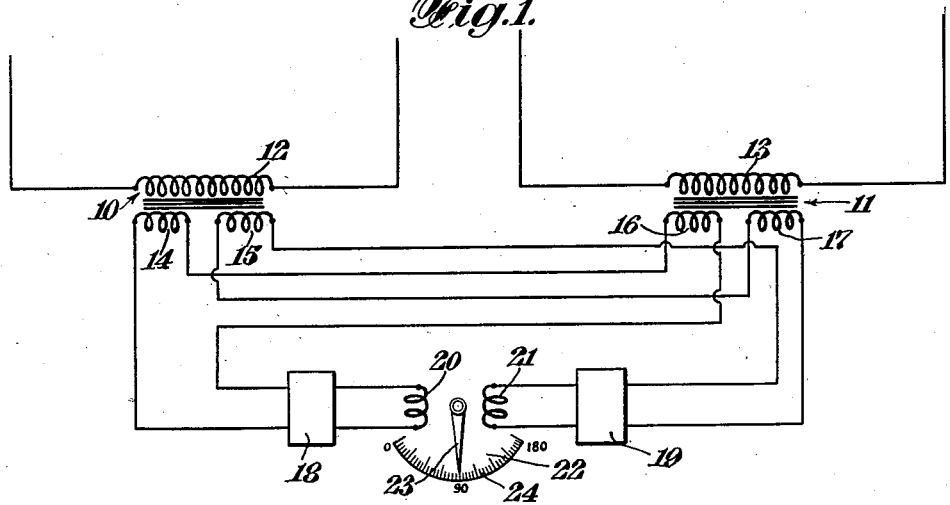
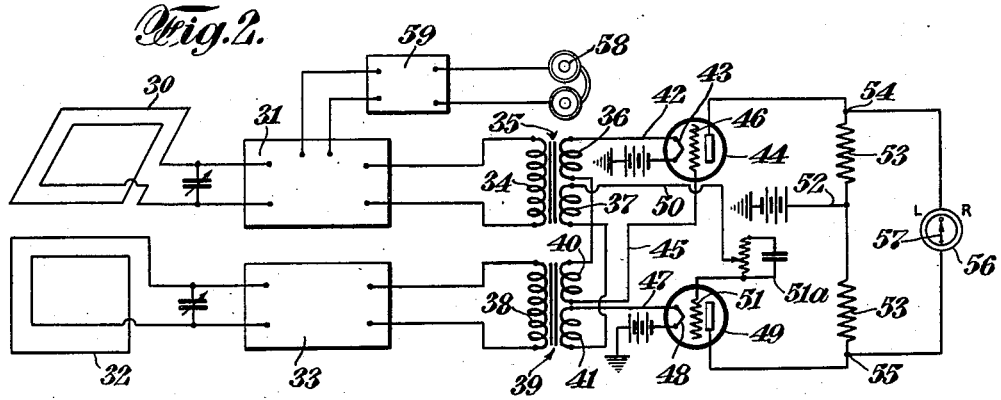
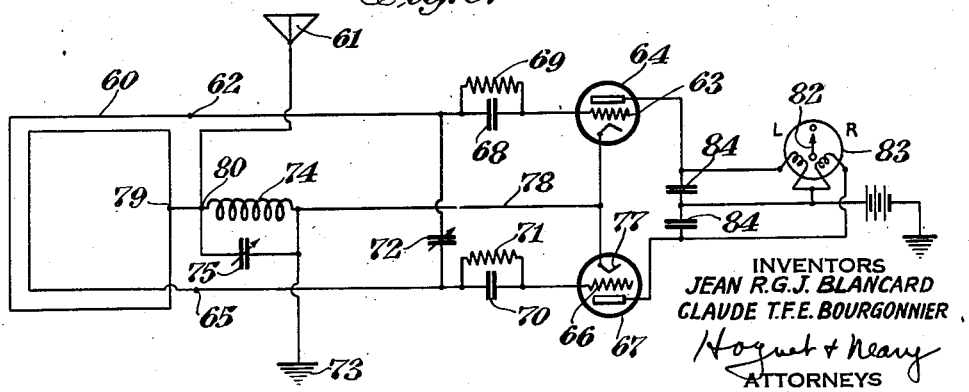
INVENTORS
JEAN R.G.J. BLANCARD
CLAUDE T.F.E. BOURGONNIER
ATTORNEYS

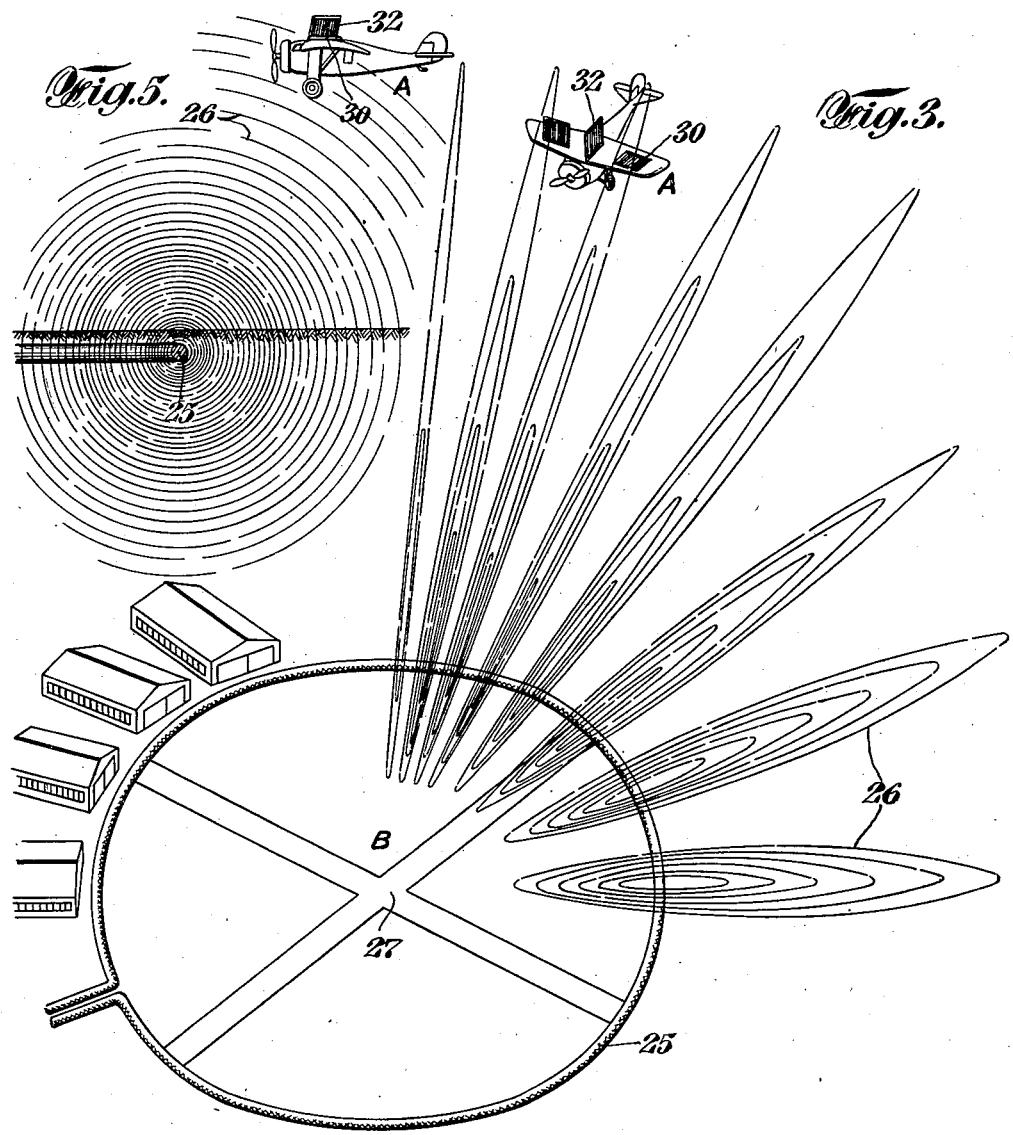
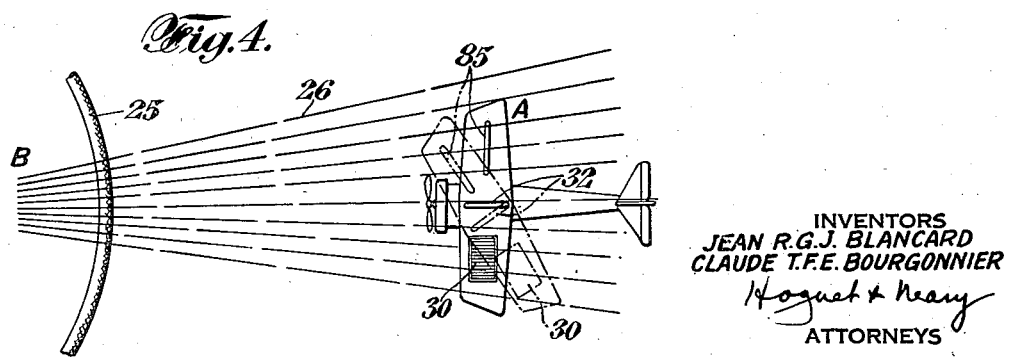

Patented July 31, 1934

1,968,068

UNITED STATES PATENT OFFICE

1,968,068

PROCESS AND APPARATUS FOR MEASURING THE PHASE DIFFERENCE OF ELECTRIC CURRENTS

Jean Roger Georges Jules Blancard, Meulan, and Claude Tony Fréderic Eugéne Bourgonnier, Paris, France, assignors to American Loth Corporation, a corporation of New York Application October 4, 1932, Serial No. 636,118
In Germany August 6, 1931

7 Claims. (Cl. 250—11)

This invention pertains generally to a method and apparatus for measuring electric currents and pertains particularly to a method and apparatus for measuring differences in phase between electric currents.

While the invention will be described in connection with its application to the requirements of aircraft uses, it is to be strictly understood that it is in no way limited thereto.

In the practice of the invention the currents are separately received from their sources, or from a common source, and these currents or derivations thereof are added algebraically, in one instance without change of sign and in another instance with a change in sign of one current or of a derivation thereof, as the case may be, which results arithmetically in an addition in one case and a subtraction in the other. From the resultant currents and differences in phase in the original, currents may be determined and, if desired, may be read directly on a suitable instrument. In addition to a determination of the phase relationship of the original currents, a determination of their relative effect values may also be obtained.

The underlying principle of this invention may be applied in many different ways, the specific applications herein shown and particularly described being for the purpose of illustration. Particular descriptions will be made in connection with radiogoniometry and guide cables as applied to maritime and aircraft uses. However, the invention is in no way limited thereto.

The invention is operable with low, medium and high frequencies and with energy from both the induction and radiation fields.

Referring to the drawings in which like reference characters are appended to like parts in the various figures, Figure 1 is a circuit diagram of one form of the invention;

Figure 2 is another circuit diagram;

Figure 3 is a diagram in perspective of a toroidal magnetic induction field;

Figure 4 is a similar diagram in plan;

Figure 5 is a similar diagram in sectional elevation, and

Figure 6 is a circuit diagram of a different form of the invention.

Referring to Figure 1, at 10 and 11 are shown two transformers having primary windings 12 and 13 respectively. The secondary windings of transformers 10 and 11 are split into halves as shown at 14 and 15 in transformer 10 and at 16 and 17 in transformer 11.

Winding 14 is connected in series with winding 16 in a manner so that they will add, for instance, when the currents in primaries 12 and 13 are in phase, whereas winding 15 is connected in series with winding 17 in a manner so that they are opposed to each other so that one will subtract from the other under similar conditions.

From the foregoing it will be seen that when the phase difference between the primary currents is less than 90°, windings 14 and 16 will add and 15 and 17 will subtract, and that when such phase difference is greater than 90°, windings 14 and 16 will subtract and windings 15 and 17 will add.

The circuit of windings 14 and 16 is connected to the input of rectifier 18, and the circuit of windings 15 and 17 is connected to the input of rectifier 19. The output of rectifier 18 is connected to winding 20, and the output of rectifier 19 is connected to winding 21 of differential ammeter 22.

The operation of the form of the invention shown in Figure 1 is as follows: When the currents in primaries 12 and 13 are either both zero or are 90° out of phase, there will be no deflection of needle 23 from the midpoint of scale 24 of differential ammeter 22. This is because when no current is flowing in either winding 20 or 21 the needle comes to rest at the midpoint, and when the currents in primaries 12 and 13 are 90° out of phase the currents in windings 20 and 21 will be equal and will cause equal and opposite forces to be exerted on the needle. When the currents in primary windings 12 and 13 are equal and in phase, there will be no current flowing in winding 21, whereas when the currents in primary windings 12 and 13 are equal and 180° out of phase, there will be no current flowing in winding 20.

When the currents in primaries 12 and 13 are equal but between zero and 90° out of phase, the current in winding 20 will be greater than the current in winding 21, the magnitude of the difference decreasing as the angle approaches 90°, being maximum at 0° and zero at 90°. As the phase angle increases above 90° the current in winding 21 becomes greater and reaches a maximum at 180°, at which time the current in winding 20 is zero. Inasmuch as the difference in magnitude of the currents in windings 20 and 21 is a function of the phase difference, scale 24 may be calibrated to read directly in differences in phase.

Thus, for phase differences from and including zero up to 90° needle 23 will be deflected to the left in Figure 1, and for phase differences between 90° and up to and including 180° needle 23 will be deflected to the right. It is to be particularly noted that this holds true even though the currents in primaries 12 and 13 are not of equal amplitude.

The principles of the circuit shown in Figure 1 find application in the form of the invention shown in Figure 2 which is particularly adapted for use in a magnetic induction field such as that induced by a current in a guide cable, or the field emanating from a cable or cables formed in a loop and encircling an airport, or in connection with a landing system such as disclosed in copending application, Serial No. 528,144, filed April 6, 1931, or otherwise.

In this form of the invention a loop aerial 30 is connected across the input of an amplifier 31. Another loop aerial shown at 32 is connected across the input of amplifier 33. Condensers 134 and 135 connected as shown may be provided for convenience in tuning.

The output of amplifier 31 is connected across primary 34 of transformer 35 having its secondary split into equal components 36 and 37.

The output of amplifier 33 is connected across primary 38 of transformer 39 having its secondary split into two equal components 40 and 41.

Secondary components 36 and 40 are connected together so that their voltage will supplement or add arithmetically when the currents in primaries 34 and 38 are less than 90° out of phase. Secondary components 37 and 41 are connected together so that their voltages will oppose or subtract arithmetically under similar phase conditions. When the currents in primaries 34 and 38 are more than 90° out of phase, the voltages in secondary components 36 and 40 oppose or subtract arithmetically and the voltages in secondary components 37 and 40 supplement or add arithmetically.

End 42 of secondary component 36 is connected to cathode 43 of tube 44 and end 45 of secondary component 40 is connected to grid 46 of tube 44.

End 47 of secondary component 41 is connected to cathode 48 of tube 49 and end 50 of secondary component 37 is connected to grid 51 of tube 49 through a balancing mechanism 51a.

The output circuits of tubes 44 and 49 are shown connected to a common terminal 52 of the B battery. Each output circuit contains a resistance 53 preferably of like magnitude so that the drop in potential between the terminal 52 and points 54 and 55 will be equal or approximately so for equal currents in the two output circuits.

An indicator 56 actuated by a difference in potential between points 54 and 55 is connected as shown.

The operation of the form shown in Figure 2, in connection with a particular aircraft use in which a magnetic induction field of toroid-like shape is set up around a landing field by an encircling cable or cables, is as follows: Loop 30 is mounted so as to receive from the magnetic induction field without exhibiting directional characteristics. This may be accomplished by mounting loop 30 substantially horizontally with respect to the craft. In this case the magnetic induction field with respect to loop 30 will remain constant as long as the craft remains upright and remains on either the inside or the outside of the loop formed by the encircling cables or cable. That is, the current induced in loop 30 will reverse in phase when passing from the outside to the inside, or vice versa. The phase of the current in primary 34 may, therefore, be considered as being unchangeable as to phase as long as loop 30 is constantly either on the inside or on the outside of the theoretical circumferential center line of the toroid.

This is illustrated diagrammatically in Figures 3, 4 and 5 in which loop 30 is shown in full lines in position A on the outside of loop cable 25, carrying a current, preferably alternating or pulsating by means of which toroid 26 is formed. No attempt has been made to show the exact shape of the toroid inasmuch as it is shown merely for the purpose of illustration. It can be seen that at any one instant of time the lines of force would pass through loop 30 in opposite directions in positions A and B in each of the figures.

Loop 32 is mounted so as to be substantially vertical with respect to the craft and in a plane substantially coincident with or parallel to the longitudinal center line of the craft. When the plane of loop 32 is parallel to the lines of force, that is, when its plane is substantially normal to the theoretical circumferential center line of the toroid 26, no current will be induced in loop 32. When loop 32 is turned in one direction from this position by turning of the craft, the current induced will have a certain phase relationship which will be 180° out of phase with respect to the current induced in the loop 32 when it is turned in the opposite direction from the normal position by turning of the craft. This is because at any one instant of time the lines of force would pass through loop 32 in opposite directions in the two side positions. Therefore, at any one instant of time the current in loop 32 may be (1) zero, (2) in phase with or (3) 180° out of phase with the current in loop 30, depending on whether (1) the craft is travelling substantially along a theoretical radius drawn from the theoretical center 27 of the toroid 27, (2) has the center 27 on one side of the plane of the loop, or (3) has the center 27 on the other side of the plane of the loop.

The phase relationship of the currents in primary windings 34 and 38 of course follows the phase relationship of the currents in the loops in 30 and 32.

When no current is flowing in primary 38, the input circuits of tubes 44 and 49 are supplied with equal amounts of energy, the input circuit of tube 44 being supplied by secondary component 36 and the input circuit of tube 49 being supplied by secondary component 37. This will cause substantially equal currents to flow in the two output circuits, thereby effecting substantially no difference in potential between points 54 and 55 and indicator 56 will register substantially at zero. In this case loop 32 is positioned parallel to the lines of force.

When loop 32 is turned with respect to the lines of force by the movement of the aircraft, for instance so that the center of the airport is on the left of the plane of the loop, current will be induced in loop 32 which will flow through primary 38. Assuming the connections are such with this position of the loop that the primary currents 34 and 38 are in phase, the voltages in secondary components 36 and 40 will supplement or add arithmetically and the voltages in secondary components 37 and 41 will oppose or subtract arithmetically. Tubes 44 and 49 being biased as detectors and the energy in the input circuit of tube 44 being greater than the energy in the input circuit of tube 49, the effect is that a greater flow of rectified current takes place in the output circuit of tube 44 than in the output circuit of tube 48, causing a difference of potential between the points 54 and 55 which in turn causes a deflection of the needle 57 of indicator 56.

The indicator might be caused to deflect to the left to indicate that the theoretical center of the airport is on the left of the plane of the loop, if desired. If this is the case, turning the craft so that the theoretical center of the airport is to the right of the plane of the loop will cause the needle to deflect to the right because in this instance and following previous assumptions the current in primary 38 is 180° out of phase with the current in primary 34 which causes a larger rectified current in the output circuit of tube 49 than in the output circuit of tube 44, thus reversing the difference in potential between points 54 and 55 and causing needle 57 to deflect oppositely.

With this arrangement the pilot may know whether he is flying toward or away from the airport. Let us assume that he is flying with the indicator at zero. With a hookup as above described a turn to the left, for instance, would place the theoretical center of the airport on the right of the loop if the craft were flying toward the airport whereas the same turn would place the theoretical center of the airport on the left of the plane of the loop if the craft were flying away from the airport. Therefore if the indicator deflects to the right upon a left turn the craft is flying toward the airport, and if the indicator deflects to the left upon a left turn, the craft is flying away from the airport.

Inasmuch as the horizontal loop 30 is constantly receiving, it is possible to pick up any signal or signals which might be included in the induction field by the transmitter. This might be accomplished for instance by connecting ear phones 58 in any suitable manner, to amplifier 31 through rectifier 59.

In following a guide cable, such for instance as those used for guiding ships in and out of harbors, the current in loop 30 will be zero as long as loop 30 is maintained directly above the cable, and will reverse in phase in passing from either side of the cable to the other. This change in phase will not occur in the vertical loop, if the vertical loop is mounted longitudinally of the ship and the ship does not turn more than 90° in either direction from the guide cable that is from the position in which the plane of the loop is normal to the lines of force about the cable. To follow the cable, therefore, it is merely necessary to fix the vertical loop along or parallel to the longitudinal center line of the vessel. The indicator needle 57 may, if desired, be made to point either to the right or to the left according to the direction that it is necessary to turn to prevent further deviation or otherwise and will point at zero when the vessel is proceeding along the cable.

As previously pointed out, if the source of the induction field comprises a cable or cables encircling the airport, the current in the horizontal loop will reverse in phase upon passing over the cable or cables into the area above the airport, or vice versa. This will cause an instantaneous reversal of the readings on the indicator and will indicate to the pilot that he has passed over the cable and is within this area, or vice versa.

To use the system for merely indicating whether a plane is on the inside or on the outside of the airport a vertical loop may be placed transversely of the craft, as shown at 85, in which case the phase of its current will remain constant as long as the craft is either constantly approaching or constantly moving away from the airport. The phase of the current in the horizontal loop will reverse when the plane passes over the cable or cables. This makes it possible to combine a horizontal loop with each of two vertical loops, one arranged longitudinally and the other transversely of the craft and to have two separate dials and indicators, one to show direction and the other to show position.

Inasmuch as the phase of the currents in the transverse vertical loop 85 will change only upon a reversal of the course of the plane, the pilot from the readings will know whether or not he is flying toward or away from the airport.

While the form illustrated in Figure 2 has been described in connection with the induction field, it is to be understood that it may also be used with the radiation field upon proper readjustment of the circuit to adapt it to such reception. Inasmuch as tubes 44 and 49 are essentially rectifiers, and indicator 56 is operated by the D. C. components in the output circuits, the radiation field may be of any character. The necessary rearrangements will become apparent to persons skilled in the art upon becoming familiar with the invention. Radio frequency transformers would be substituted and means would preferably be provided to by-pass radio frequency currents around resistances 53, etc. When using, the radiation field loops 30 and 32 would preferably both be vertical, one mounted preferably longitudinally and the other preferably transversely of the aircraft. An ordinary antenna might be substituted for the longitudinal loop.

In the form shown in Figure 6 the field, either induction or radiation, is received on two antennæ 60 and 61. Antenna 60 is of a directional type, for instance a loop. It has an end 62 connected to the grid 63 of a tube 64 and an end 65 connected to the grid 66 of a tube 67. Condenser 68 and grid leak 69 and condenser 70 and grid leak 71 may be provided, if desired, for the purpose of maintaining a proper bias on grids 63 and 66. A variable condenser 72 may be connected across the ends of coil 60 for tuning purposes.

Loop 60 would preferably be mounted transversely of the plane when operating on the radiation field so as to receive no energy when directly proceeding toward or directly away from the field.

Antenna 61, which is of a non-directional character or is of a directional character but mounted so as to have non-directional characteristics at the proper time, as will hereafter appear, is connected to the ground as indicated at 73 through an oscillatory circuit comprising inductance 74 and variable condenser 75. Cathode 76 of tube 64 and cathode 77 of tube 67 are grounded through conductor 78. The approximate center point 79 of coil 60 is connected to antenna 61 as shown at 80.

The form of the invention shown in Figure 6 operates as follows: The signal received by antenna 61, acting in a non-directional manner, is impressed upon the center point of loop 60, and is thus impressed upon grids 63 and 66 without any difference in phase. The same signal received by coil 60 is also impressed upon grids 63 and 66 but will be 180° out of phase on the two grids. The result is that the energy from the loop at one of the grids will be in phase with the energy from the antenna 61 so as to supplement or add thereto, and the energy from the loop at the other grid will be 180° out of phase with energy from antenna 61 and will oppose or subtract therefrom.

The result is that there is a larger D. C. component in one output circuit than in the other, causing a deflection of needle 82 of indicator 83 which, as shown, is of the differential character, although obviously it may be of any other suitable type.

The direction of this deflection would depend upon which direction the air craft would have to turn to come back to a theoretical line drawn through the craft and the transmitting station.

To use the form shown in Figure 6 with the induction field first above described, non-directionally mounted loop 30 would be substituted for antenna 61 and directional loop 60 would correspond to directional loop 32. The flying manipulation would be in all respects similar. The same applies to guide cable or other uses.

If loop 60 were parallel to the lines of force so as to have no induced currents the rectified components in the output circuits would be equal and there would be no deflection of the needle 83. If loop 60 were not in this position, the output circuit having the larger D. C. component would depend upon the direction in which loop 60 would be turned from the parallel position.

When following a guide cable loop 60 would correspond to loop 30 which would then operate directionally, that is, would be maintained horizontal, and loop 32, which would then operate non-directionally, would be substituted for antenna 61.

When receiving on the radiation field loop 60 would be mounted so as to operate directionally and antenna 61 would operate non-directionally to give the indications above described. It is, of course, understood that reversal in phase in antenna 61, if of a directional type, might be availed of as reversal in phase in loop 30 in Figure 2 is availed of or that of loop 32 in flying toward or away from the airport.

Any other antenna, such as a loop mounted longitudinally of the plane, might be substituted for antenna 61 without departing from the spirit of the invention.

Condensers 84 are by-pass condensers.

Heating of cathodes in all forms of the invention illustrated in the drawings may be accomplished in any approved and suitable manner.

It is of course understood that the particular descriptions herein are merely for the purposes of illustration. This applies particularly to Figures 3, 4 and 5 in which the shape and characteristics of a magnetic induction field set up about loop 25 is illustrated purely to assist in clarifying the invention. It is possible that the induction field may not be a true toroid and that the lines of force may deviate from planes perpendicular to the cable 25, due to local and/or other conditions. This, however, in no way detracts from the invention inasmuch as the lines of force may be followed to their source, regardless of their shape, any distance from such source.

It is also understood that the cable 25 may have any configuration and may be replaced by any other transmission system.

Having described the invention, it is obvious that many modifications may be made in the same within the scope of the claims without departing from the spirit thereof.

We claim:

1. In a system of the kind described and in combination, transmitting means, receiving means, said receiving means comprising a non-directional antenna, a directional antenna, two rectifiers, means for connecting said non-directional antenna to the input circuits of said rectifiers to impress equal voltages therein, means for connecting said directional antenna to said input circuits to impress equal voltages therein, the voltage impressed by said directional antenna being substantially in phase with the voltage impressed by said non-directional antenna in the input circuit of one of said rectifiers and substantially 180° out of phase with the voltage impressed by said non-directional antenna in the input circuit of the other of said rectifiers to cause a current differential in the output circuits of said rectifiers, means for determining the output circuit having the larger current, and means for causing said current differential to alternate from one rectifier to the other determined by the position of said directional antenna with respect to said transmitting means.

2. In a system of the kind described and in combination, a transmitting means, a receiving means, said receiving means having a non-directional antenna, a directional antenna, a pair of rectifiers, the input of each rectifier coupled to each antenna in a manner so that a signal when received by one of said antennas is impressed upon said input circuits substantially in phase, said signal when received by the other of said antennas being impressed upon said input circuits substantially 180° out of phase, so that the signal components will add in one input circuit and will subtract in the other input circuit, means connected across said rectifiers to indicate current differential therebetween and the rectifier having the larger current, and means for causing the rectifier having said larger current to be dependent upon the position of said directional antenna with respect to said transmitting means.

3. A receiving circuit comprising a directional antenna, a non-directional antenna, a pair of detector tubes, means for impressing a signal received on said non-directional antenna equally in the input circuits of said tubes, means for impressing said signal when received on said directional antenna equally in the input circuits of said tubes and substantially in phase with the signal of said non-directional antenna in one input circuit but substantially 180° out of phase in the input circuit of the other of said tubes, the input circuit in which the signal components are in phase being dependent upon the phase relationship of the energy in said antennae, and means for indicating the differential between the currents in the output circuits of said tubes.

4. A receiving circuit comprising a directional antenna, a non-directional antenna, a pair of relays, each relay having a control circuit and an output circuit, means for coupling one of said antennas to said control circuits to impress a signal received by said antenna in each control circuit, said signal being substantially 180° out of phase in said control circuits, means for coupling the other of said antennas to said control circuits to impress a signal received by said antenna substantially in phase in said control circuits, and means for indicating current differential in said output circuits.

5. A receiving circuit comprising a directional antenna, a non-directional antenna, a pair of relays, each relay having a control circuit and an output circuit, means for impressing a signal from one of said antennas upon the control circuits of said relays substantially 180° out of phase, means for simultaneously impressing said signal from the other of said antennas upon said control circuits substantially in phase, and means for indicating current differential in the output circuits of said relays, said last mentioned means adapted to show the phase relationship of any directional antenna signal with respect to said non-directional antenna signal and to show the absence of a directional antenna signal.

6. A receiving circuit comprising a directional antenna, a non-directional antenna, a pair of relays, each relay having an input circuit and an output circuit, two transformers having equally split secondary windings, the primary of one transformer coupled to said directional antenna, the primary of the other transformer coupled to said non-directional antenna, one section of each secondary winding coupled to the input circuit of one relay in a manner so that their voltages add when the currents in said primary windings are in phase and subtract when said currents are 180° out of phase, the other section of each secondary winding coupled to the input circuit of the other relay so that their voltages subtract when said currents in said primaries are in phase and add when said currents are 180° out of phase, and means for indicating the character of any current differential in the output circuits of said relays.

7. A receiving circuit comprising a directional antenna, a non-directional antenna, a pair of detector tubes, each tube having an input circuit and an output circuit, means for coupling said directional antenna to said input circuits to impress a signal received on said antenna in said input circuits 180° out of phase, means for coupling said non-directional antenna to said input circuits to impress a signal received on said non-directional antenna in said input circuits in phase, and means coupled to the output circuits of said tubes adapted to indicate any current differential in said output circuits and the output circuits having said current differential.

JEAN ROGER GEORGES
JULES BLANCARD.
CLAUDE TONY FRÉDERIC
EUGÉNE BOURGONNIER.